Dec. 8, 1931.  R. R. KLUCK  1,835,880

HITCH

Filed April 6, 1929

Robert Roy Kluck
INVENTOR

BY Victor J. Evans
ATTORNEY

Patented Dec. 8, 1931

1,835,880

UNITED STATES PATENT OFFICE

ROBERT ROY KLUCK, OF WATERTOWN, SOUTH DAKOTA

HITCH

Application filed April 6, 1929. Serial No. 353,113.

This invention relates to hitches, an object being to provide a hitch which may be secured to a trailer so that the latter will follow directly in the line of travel of the towing vehicle irrespective of speed and load.

Another object of the invention is the provision of a hitch which will also provide for inequalities or unevenness of the road, the connection between the towing vehicle and trailer providing for longitudinal unevenness of roadbed, while the construction of the hitch and its manner of connection with the trailer takes care of transverse unevenness and permits one wheel to ride higher than the other without danger of injury to the hitch.

With the above and other objects in view, the invention further includes the following novel features and details of construction, to be hereinafter more fully described, illustrated in the accompanying drawings and pointed out in the appended claim.

In the drawings:—

Figure 1:
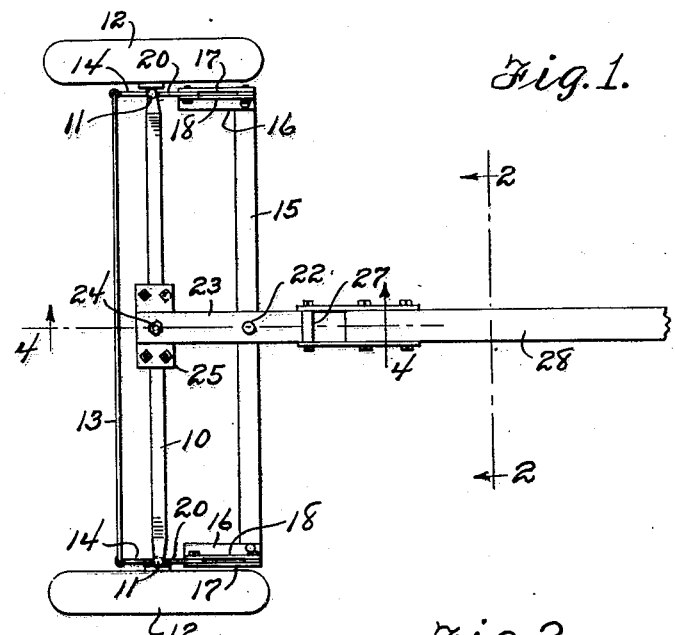
Figure 1 is a fragmentary view showing a portion of the front of a trailer with the hitch applied.
Figure 2:
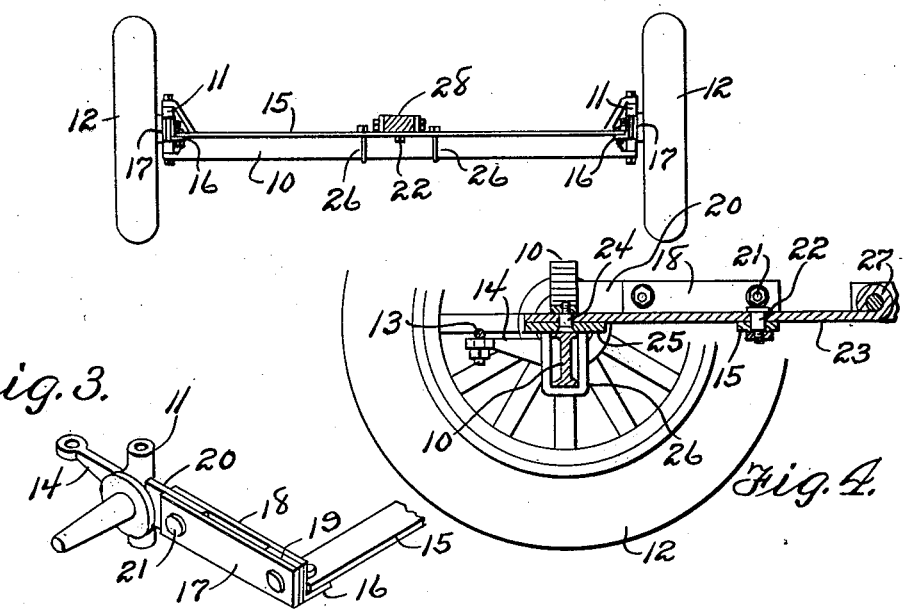
Figure 2 is a section on the line 2—2 of Figure 1.
Figure 3:
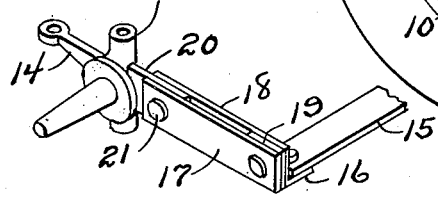
Figure 3 is a detail perspective view showing the connection between the hitch and the steering knuckles of the trailer.
Figure 4:
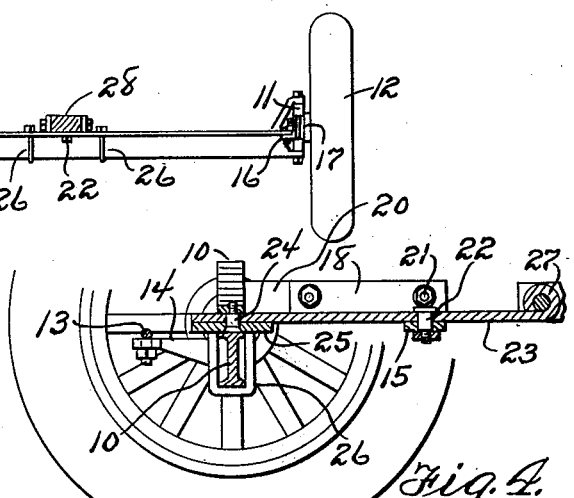
Figure 4 is an enlarged fragmentary sectional view taken substantially on the line 4—4 of Figure 1.

Referring to the drawings in detail wherein like characters of reference denote corresponding parts, the reference character 10 indicates the front axle of a vehicle used as a trailer and the reference character 11 indicates the steering knuckles at each end thereof which connect the axle with the front wheels 12. The steering knuckles are connected by the usual tie rod 13 through the medium of the usual arms 14.

The construction just described forms a part of the usual steering mechanism of an automobile and permits of an otherwise useless automobile being utilized as a trailer.

The invention provides means for connecting the trailer with a towing vehicle and for this purpose provides a rod 15 which has arms 16 connected to its opposite ends. The arms 16 are of novel construction and each comprises an outer flat bar 17 and an inner angle bar 18, a spacer 19 being positioned between the forward ends of these bars. Rigidly secured to the steering knuckles 11 are ears 20 which extend between the inner ends of the bars 17 and 18 and are connected thereto by means of a pin 21. The ends of the rod 15 are pivotally connected as shown at 22 to the horizontal flanges of the angle bars 18 so that horizontal pivotal movement between the arms 16 and rod 15 is permitted.

Pivotally secured to the rod 15 as shown at 22 is a draw head 23. This head may be formed of a flat plate or bar and has its inner end pivotally secured as shown at 24 to a plate 25, the latter being clamped upon the axle 10 by means of spaced U bolts 26.

Pivotally secured to the outer end of the draw head as shown at 27 is the inner end of a towing bar 28. The outer end of this bar may be secured to the towing vehicle in any desired manner.

It will be apparent from the foregoing description and accompanying drawings that longitudinal inequalities of the road may be compensated for by the pivotal connection 27 between the inner end of the towing bar and the outer end of the draw head. This is especially useful when either of the wheels 12 suddenly strike a hump or depression in the road.

It will also be apparent that when the towing vehicle is steered the steering knuckles of the trailer will be operated through the rod 15 and arms 16, so that the trailer will be caused to accurately follow the towing vehicle irrespective of speed or load.

The invention is susceptible of various changes in its form, proportions and minor details of construction and the right is herein reserved to make such changes as properly fall within the scope of the appended claim.

Having described the invention what is claimed is:—

A hitch including a tongue and a connecting bar extending parallel with an axle of a vehicle to be towed, a flat plate forming a draw head hinged to the tongue and pivotally connected to the bar and extending rearwardly thereof and over the axle, a clamp secured to the axle and pivoted to the plate, arms at the ends of the bar and including parallel plates secured together in spaced relation and the inner plate having laterally extending flanges at the lower edges with the ends of the bar resting thereon, pins connecting the bar to the flanges, said plates receiving ears of steering knuckles of the axle, and pins connecting the plates together and some of said last named pins connecting the plates to the ears of the steering knuckles.

In testimony whereof I affix my signature.

ROBERT ROY KLUCK.